(12) United States Patent
Zhang et al.

(10) Patent No.: US 11,641,109 B2
(45) Date of Patent: May 2, 2023

(54) GRID-FORMING WIND TURBINE CONTROL METHOD FOR DIODE RECTIFIER UNIT-BASED OFFSHORE WIND POWER TRANSMISSION SYSTEM

(71) Applicant: ZHEJIANG UNIVERSITY, Hangzhou (CN)

(72) Inventors: Zheren Zhang, Hangzhou (CN); Zheng Xu, Hangzhou (CN); Yanqiu Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/953,457

(22) Filed: Sep. 27, 2022

(65) Prior Publication Data

US 2023/0028397 A1   Jan. 26, 2023

Related U.S. Application Data

(63) Continuation of application No. PCT/CN2022/107364, filed on Jul. 22, 2022.

(30) Foreign Application Priority Data

May 17, 2022   (CN) .......................... 202210531669.8

(51) Int. Cl.
*H02J 3/18* (2006.01)
*H02J 3/38* (2006.01)
(Continued)

(52) U.S. Cl.
CPC ................ *H02J 3/18* (2013.01); *H02J 3/381* (2013.01); *F03D 7/00* (2013.01); *F03D 7/04* (2013.01);
(Continued)

(58) Field of Classification Search
CPC ........... H02J 3/28; H02J 3/381; H02J 2300/28
See application file for complete search history.

(56) References Cited

U.S. PATENT DOCUMENTS 7,423,411 B2 *  9/2008  Sihler ..................... H02P 23/04
                                                                322/19
9,093,919 B2 *  7/2015  Chapman ................ H02M 1/12
(Continued)

FOREIGN PATENT DOCUMENTS

CN     105071372 A     11/2015
CN     108123460 A      6/2018
(Continued)

OTHER PUBLICATIONS

Zhi et al., "Direct Power Control of DFIG With Constant Switching Frequency and Improved Transient Performance", Jun. 2006, IEEE Transactions on Energy Conversion, vol. 22, No. 1, Mar. 2007. (Year: 2006).*

(Continued)

*Primary Examiner* — Mohammad Ali
*Assistant Examiner* — Kelvin Booker (57) ABSTRACT

A grid-forming wind turbine control method for a diode rectifier unit-based offshore wind power transmission system. A control system for controlling a grid-side converter has a three-layered structure, where a first layer is a combination of an active power controller and a reactive power controller; a second layer is a voltage controller; and a third layer is a current controller. The actual reactive power is represented by a per-unit value of a capacity of a corresponding wind turbine unit. The wind turbine units have the same reactive-power reference value, which is constant and does not change with time. The reactive power controllers of all wind turbine units have the same structure and parameters.

8 Claims, 6 Drawing Sheets

(51) Int. Cl.
 *F03D 7/00* (2006.01)
 *F03D 7/04* (2006.01)
 *H02M 1/12* (2006.01)
 *H02M 1/14* (2006.01)

(52) U.S. Cl.
 CPC ............ *H02J 2300/28* (2020.01); *H02M 1/12* (2013.01); *H02M 1/14* (2013.01)

(56) References Cited

U.S. PATENT DOCUMENTS

| | | | |
|---|---|---|---|
| 9,407,133 | B1 | 8/2016 | Alexander |
| 10,505,467 | B2* | 12/2019 | Dorn ..................... H02M 1/143 |
| 2007/0013194 | A1* | 1/2007 | Galley ..................... F03D 9/11 290/44 |
| 2011/0156389 | A1 | 6/2011 | Arlaban Gabeiras |
| 2016/0049880 | A1* | 2/2016 | Kim ........................ H02M 1/12 363/35 |
| 2017/0009738 | A1* | 1/2017 | Brogan ................... F03D 9/255 |
| 2017/0009743 | A1* | 1/2017 | Brogan ................... F03D 7/042 |
| 2017/0009744 | A1* | 1/2017 | Brogan ................... G05F 1/455 |
| 2017/0009745 | A1* | 1/2017 | Brogan ..................... F03D 7/00 |
| 2018/0013288 | A1 | 1/2018 | Yang et al. |
| 2019/0170117 | A1* | 6/2019 | Letas ....................... F03D 7/048 |
| 2019/0309728 | A1* | 10/2019 | Abeyasekera .......... F03D 7/047 |
| 2020/0021236 | A1* | 1/2020 | Pan ......................... H02J 3/381 |
| 2021/0159704 | A1 | 5/2021 | Schwanka Trevisan et al. |
| 2021/0376594 | A1* | 12/2021 | Zhang .................. H02H 7/1216 |
| 2022/0252046 | A1* | 8/2022 | Xu ............................ H02J 3/36 |
| 2022/0393473 | A1* | 12/2022 | Xu ....................... H02M 7/5395 |

FOREIGN PATENT DOCUMENTS

| | | |
|---|---|---|
| CN | 108462203 A | 8/2018 |
| CN | 108539779 A | 9/2018 |
| CN | 109038691 A | 12/2018 |
| CN | 109347121 A | 2/2019 |
| CN | 109995053 A | 7/2019 |
| CN | 110034586 A | 7/2019 |
| CN | 110829479 A | 2/2020 |
| CN | 111697595 A | 9/2020 |
| CN | 112039131 A | 12/2020 |
| CN | 112421670 A | 2/2021 |
| CN | 113809777 A | 12/2021 |
| CN | 114050561 A | 2/2022 |
| CN | 114066329 A | 2/2022 |

OTHER PUBLICATIONS

Xu et al., "Direct Active and Reactive Power Control of DFIG for Wind Energy Generation" Jun. 2005, IEEE Transactions on Energy Conversion, vol. 21, No. 3, Sep. 2006. (Year: 2005).*

Xu et al., "Dynamic Modeling and Control of DFIG-BasedWind Turbines Under Unbalanced Network Condition", Jul. 2006, IEEE Transactions on Power Systems, vol. 22, No. 1, Feb. 2007. (Year: 2006).*

Xie et al., "A Comprehensive LVRT Control Strategy for DFIG Wind Turbines With Enhanced Reactive Power Support", Aug. 2012, IEEE Transactions on Power Systems, vol. 28, No. 3, Aug. 2013. (Year: 2012).*

Sao et al., "Control and Power Management of Converter Fed Microgrids", Oct. 2006, IEEE Transactions on Power Systems, vol. 23, No. 3, Aug. 2008. (Year: 2006).*

Hu et al., "Dynamic Modeling and Improved Control of DFIG Under Distorted Grid Voltage Conditions", Mar. 2010, IEEE Transactions on Energy Conversion, vol. 26, No. 1, Mar. 2011 163. (Year: 2010).*

Yu, Lujie et al., Analysis and Control of Offshore Wind Farms Connected with Diode Rectifier based HVDC System. IEEE Transactions on Power Delivery, vol. 35, Issue: 4, Aug. 2020, pp. 2049-2059.

Bidadfar, Ali et al., Control of Offshore Wind Turbines Connected to Diode-Rectifier-Based HVdc Systems. IEEE Transactions on Sustainable Energy, vol. 12, Issue: 1, Jan. 2021, pp. 514-523.

Tang Yingjie et al., Diode Rectifier Unit Based LFAC Transmission for Offshore Wind Farm Integration, Electric Power, vol. 53, No. 7, Jul. 2020, pp. 44-55; College of Electric Engineering, Zhejiang University, Hangzhou 310027, China.

Zhang Zheren et al.,HVDC Transmission Scheme of Grid-following Medium-frequency Distant Offshore Wind Farm for Offshore Platform Miniaturization, automation of electric power systems, vol. 45, Issue 21, Nov. 10, 2021, pp. 139-148; College of Electric Engineering, Zhejiang University, Hangzhou 310027, China.

* cited by examiner

ID-FORMING WIND TURBINE CONTROL
METHOD FOR DIODE RECTIFIER
UNIT-BASED OFFSHORE WIND POWER
TRANSMISSION SYSTEM

CROSS-REFERENCE TO RELATED APPLICATIONS

This application is a continuation of International Patent Application No. PCT/CN2022/107364, filed on Jul. 22, 2022, which claims the benefit of priority from Chinese Patent Application No. 202210531669.8 filed on May 17, 2022. The content of the aforementioned applications, including any intervening amendments thereto, is incorporated herein by reference in its entirety.

TECHNICAL FIELD

This application relates to power transmission and distribution of power systems, and more particularly to a grid-forming wind turbine control method for a diode rectifier unit-based offshore wind power transmission system.

BACKGROUND

Offshore wind farms have played a predominated role in the future wind power development due to their abundant and stable wind resources. How to achieve the reliable integration of long-distance large-capacity offshore wind power has been a research hotspot in the offshore wind power field.

Small-scale nearshore wind farms generally adopt a power-frequency high voltage alternating current (HVAC) transmission system for grid connection. Even though the above technical solution has high maturity and low investment cost, the capacitance effect seriously restricts the transmission distance of alternating current (AC) submarine cables. Until now, the offshore wind farms that have been put into operation have basically adopted the modular multilevel converter-based high-voltage direct current (MMC-HVDC) transmission system. However, it is necessary to build a large offshore converter station platform, which has high cost and large construction difficulty.

Recently, extensive attention has been paid to the diode rectifier unit (DRU) to further optimize the economic efficiency of the offshore wind power grid-connected system. Compared with other low-cost converter topologies, the DRU has smaller power loss, lower cost and higher reliability, and thus has a brilliant application prospect in the grid connection of offshore wind farms. It is estimated that the DRU could bring a 65% decline in the investment cost of the offshore platform compared with the MMC-HVDC system.

Regarding a DRU-based offshore wind power transmission system, the offshore wind farm is connected to an onshore power grid via a DRU-based rectifier station and a modular multilevel inverter (MMC)-based inverter station. The offshore wind farm contains multiple wind turbine units, which are collected to the AC bus of the offshore wind farm through the medium-voltage collector system, where the wind turbine unit includes a wind turbine, a machine-side converter, a grid-side converter, and a step-up transformer.

The key to the effective implementation of the DRU-based offshore wind farm integration scheme lies in whether the amplitude and frequency of the offshore AC grid voltage can be effectively controlled. The DRU is free of active control capability, and thus an external voltage source is required to provide the commutation voltage. It has been proposed to install additional equipment to support the AC voltage source of the offshore power grid, such as the parallel AC submarine cable for connection to the onshore power grid, or the parallel small-capacity static synchronous compensator (STATCOM). However, the installation of the additional equipment will weaken the economic benefits brought by the DRU.

In order to maximize the economic advantages of the DRU-based offshore wind power transmission system, some references have proposed to make the wind turbine operate in a grid-forming mode to control the voltage of the offshore AC system. The design of the grid-forming controller for the wind turbine is of great importance, and the technical challenges are how to control the reactive power to be evenly distributed among all the wind turbines without communication, and how to control the frequency of the wind turbines. Currently, the wind turbine frequency and the reference phase of the control system are controlled mainly by phase-locked loop (PLL) and global unified reference coordinate system. For the PLL-based strategy, the phase locking may fail, leading to the system instability; while for the global unified reference coordinate system-based scheme, the PLL is canceled, but it is required to send GPS signals to all wind turbines, leading to complicated implementation.

The existing researches mainly focus on using PLL or GPS signals to control the frequency of wind turbines. In order to further enhance the technical and economic advantages of the DRU-based offshore wind farm integration and the reliability of the grid-forming wind turbines, it is urgently needed to optimize the grid-forming control strategy of wind turbines.

SUMMARY

An objective of this application is to provide a grid-forming wind turbine control method for a diode rectifier unit-based offshore wind power transmission system, which has simple operation, high reliability and strong versatility. The control method is suitable for various DRU-based offshore wind power transmission scenarios, which can significantly improve the economic efficiency of the offshore wind farm integrated system, and have a brilliant application prospect in practical projects.

Technical solutions of this application are described as follows.

This application provides a grid-forming wind turbine control method for a diode rectifier unit (DRU)-based offshore wind power transmission system, wherein the DRU-based offshore wind power transmission system comprises an offshore wind farm; the offshore wind farm comprises a plurality of wind turbine units; the grid-forming wind turbine control method is used to control a grid side converter of each of the plurality of wind turbine units; and the grid-forming wind turbine control method comprises:

(1) converting, by an active controller, a difference between $P_{wt}^*$ and $P_{wt}$ into a voltage amplitude reference value $U_{wt}^*$; and converting, by a reactive power controller, a difference between $Q_{wt}$ and $Q_{wt}^*$ into a frequency f of each of the plurality of wind turbine units; wherein $P_{wt}^*$ is an active power reference value of each of the plurality of wind turbine units; $Q_{wt}^*$ is a reactive power reference value of each of the plurality of wind turbine units; $P_{wt}$ is an actual active power output of each of the plurality of wind turbine units; and $Q_{wt}$ is an actual reactive power output of each of the plurality of wind turbine units;

(2) taking $U_{wt}^*$ as a d-axis voltage reference value $u_{fd}^*$; letting a q-axis voltage reference value $u_{fq}^*$ be equal to 0; converting $u_{fd}^*$ into a d-axis modulating voltage reference value $u_{vd}^*$ through modulation by using a voltage controller and a current controller in sequence; and converting $u_{fq}^*$ into a q-axis modulating voltage reference value $u_{vq}^*$ through modulation by using the voltage controller and the current controller in sequence; and (3) subjecting the frequency f of each of the plurality of wind turbine units to integral transformation to obtain a reference phase θ of each of the plurality of wind turbine units; subjecting the $u_{vd}^*$ and $u_{vq}^*$ to coordinate transformation to obtain three-phase modulating voltage reference values $u_{va}$, $u_{vb}$ and $u_{vc}$, in an abc coordinate system by using the reference phase θ; and subjecting the $u_{va}$, $u_{vb}$ and $u_{vc}$ to pulse width modulation (PWM) to control power switching devices in the grid-side converter of each of the plurality of wind turbine units.

In an embodiment, the actual reactive power output $Q_{wt}$ of each of the plurality of wind turbine units is represented based on a per-unit value of a capacity of a corresponding wind turbine unit.

In an embodiment, the plurality of wind turbine units are the same in the reactive power reference value $Q_{wt}^*$; and the reactive power reference value $Q_{wt}^*$ is a constant value and does not change with time.

In an embodiment, reactive power controllers respectively used for controlling grid-side converters of the plurality of wind-turbine units have the same structure and parameters.

In an embodiment, the active power controller adopts a lead-lag link in series with an integral link, and a transfer function of the lead-lag link in series with the integral link is expressed as $$K_1 \frac{T_{P1}s+1}{T_{P2}s^2+s};$$

wherein $K_1$ is a proportional coefficient; $T_{P1}$ and $T_{P2}$ are time constants; and s is a Laplace operator.

In an embodiment, the reactive power controller adopts a lead-lag link, and a transfer function of the lead-lag link is expressed as $$K_2 \frac{T_{Q1}s+1}{T_{Q2}s+1};$$

wherein an output of the reactive power controller is a frequency deviation Δf, the Δf and a rated frequency $f_0$ of each of the plurality of wind turbine units are added to obtain a frequency f of a corresponding wind turbine unit; wherein $K_2$ is a proportional coefficient; $T_{Q1}$ and $T_{Q2}$ are time constants; and s is a Laplace operator.

In an embodiment, the reference phase θ is an integral result of the frequency f of each of the plurality of wind turbine units with respect to time.

In an embodiment, the DRU-based offshore wind power transmission system is a low-frequency offshore wind power alternating-current (AC) collection and transmission system, a power-frequency offshore wind power AC collection and direct-current (DC) transmission system, or a medium-frequency offshore wind power AC collection and DC transmission system.

Compared with the prior art, this application has the following beneficial effects.

1. The reactive-power controller provided herein is capable of evenly distributing the reactive power without communication among all wind turbines, and controlling the alternating current frequency of the wind turbines without PLL or GPS signals. The control scheme proposed herein has simple operation and high reliability, and is suitable for the control of the grid-forming wind turbines.
2. The method provided herein has strong versatility, and is suitable for various diode rectifier unit-based offshore wind power transmission systems. Moreover, the method does not require additional equipment, lowering the project cost and having a brilliant application prospect.

DETAILED DESCRIPTION OF EMBODIMENTS

This application will be described in detail below with reference to the accompanying drawings and embodiments.

In a grid-forming wind turbine control method provided herein for a diode rectifier unit (DRU)-based offshore wind power transmission system, the control system for controlling a grid-side converter includes three layers, where a first layer is an active-power controller and a reactive power controller; a second layer is a voltage controller; and a third layer is a current controller. The controllers of the second layer and the third layer adopt the conventional passive controllers of modular multilevel converter (MMC) (Xu Zheng et al. "Voltage source converter based high-voltage direct current (VSC-HVDC) transmission system" (2nd edition), [M]. Beijing: China Machine Press, 2017).

Figure 3A:
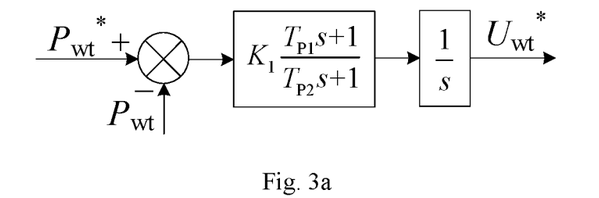
FIG. 3a is a structural diagram of an active-power controller according to an embodiment of this application.

In this embodiment, an active-power controller is a lead-lag link in series with an integral link, in which a numerator of the lead-lag link is expressed as $K_1(T_{P1}+1)$; and a denominator of the lead-lag link is expressed as $(T_{P2}s+1)$. An input of the active-power controller is a value obtained by subtracting an actual active power output $P_{wt}$ of each of the plurality of wind turbine units from an active power controller reference value $P_{wt}{}^*$ of each of the plurality of wind turbine units. An output of the active-power controller is a voltage amplitude reference value $U_{wt}{}^*$.

Figure 3B:
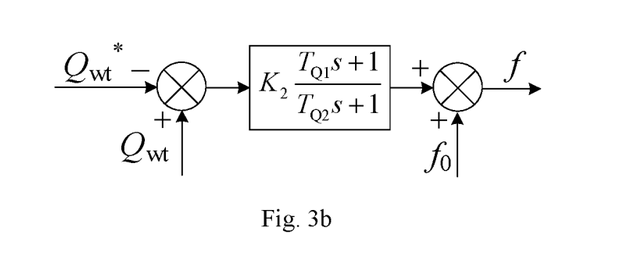
FIG. 3b is a structural diagram of a reactive-power controller according to an embodiment of this application.

In this embodiment, a reactive power controller is a lead-lag link, in which a numerator of the lead-lag link is expressed as $K_2(T_{Q1}s+1)$; and a denominator of the lead-lag link is expressed as $(T_{Q2}s+1)$. An input of the reactive-power controller is a value obtained by subtracting a reactive-power reference value $Q_{wt}{}^*$ from an actual reactive power output $Q_{wt}{}^*$ of each of the plurality of wind turbine units, and an output of the reactive-power controller is a wind turbine frequency f. The actual reactive power output $Q_{wt}$ of each of the plurality of wind turbine units is represented based on a per-unit value of a capacity of a corresponding wind turbine unit. A reference phase θ of the control system is an integral result of a frequency f of each of the plurality of wind turbine units with respect to time.

Figure 2:
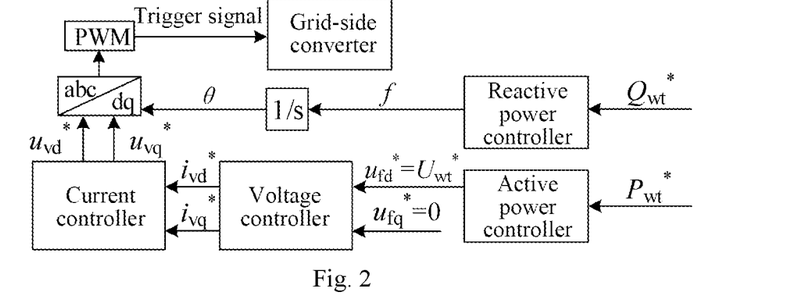
FIG. 2 schematically shows an operation principle of a control system for a grid-side converter of a wind turbine according to an embodiment of this application.

The voltage amplitude reference value $U_{wt}{}^*$ output by the active power controller is a d-axis modulating voltage reference value $u_{fd}{}^*$ of the voltage controller. A q-axis voltage reference value $u_{fq}{}^*$ of the voltage controller is set to be zero.

The plurality of wind turbine units are the same in the reactive power reference value $Q_{wt}{}^*$. The reactive power reference value $Q_{wt}{}^*$ is a constant value and does not change with time. The reactive power controllers used by all the wind turbines connected to the system have the same structure and parameters.

Figure 1:
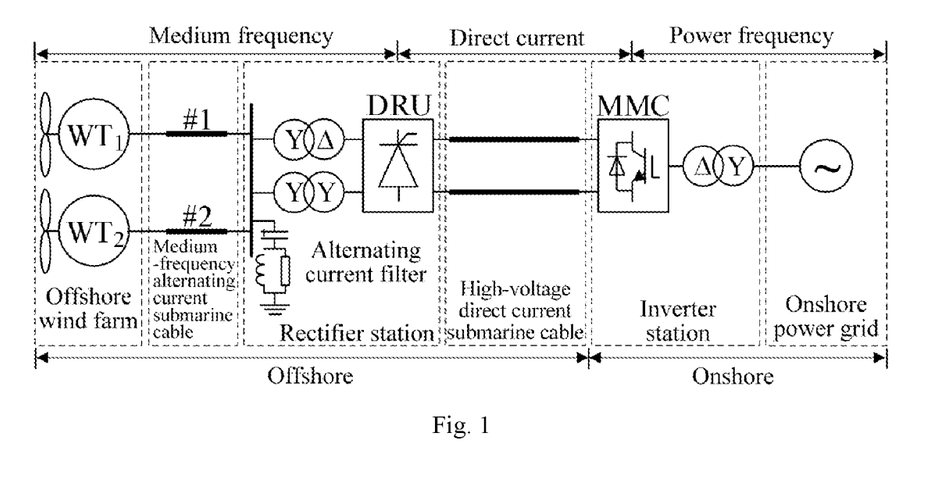
FIG. 1 is a structural diagram of a diode rectifier unit (DRU)-based offshore wind power transmission system according to an embodiment of this application.

Referring to an embodiment shown in FIG. 1, the DRU-based offshore wind power transmission system is composed of an offshore wind farm, a medium-frequency alternating-current (AC) submarine cable, a rectifier station, a high-voltage direct current submarine cable, an inverter station and an onshore power grid, all of which are connected in sequence. The offshore wind farm includes two wind turbine units, and each of the two wind turbine units is composed of a wind turbine, a machine-side converter, a grid-side converter, and a step-up transformer, all of which are connected in sequence. The control system of the grid-side inverter is shown in FIG. 2, and specifically implemented through the following steps.

(1) The active-power controller converts a difference between $P_{wt}{}^*$ and $P_{wt}$ into a voltage amplitude reference value $U_{wt}{}^*$. The reactive-power controller converts a difference between $Q_{wt}$ and $Q_{wt}{}^*$ into a frequency f of each of the two wind turbine units. $P_{wt}{}^*$ is an active power reference value of each of the two wind turbine units; $Q_{wt}{}^*$ is a reactive power reference value of each of the two wind turbine units; $P_{wt}$ is an actual active power output of each of the two wind turbine units; and $Q_{wt}$ is an actual reactive power output of each of the two wind turbine units.

As shown in FIG. 3a, the active power controller adopts a lead-lag link in series with an integral link. A transfer function of the lead-lag link in series with the integral link is expressed as $$K_1 \frac{T_{P1}s+1}{T_{P2}s^2+s},$$

where $K_1$ is a proportional coefficient; $T_{P1}$ and $T_{P2}$ are time constants; and s is a Laplace operator.

As shown in FIG. 3b, the reactive power controller adopts a lead-lag link, and a transfer function of the lead-lag link is expressed as $$K_2 \frac{T_{Q1}s+1}{T_{Q2}s+1},$$

where an output of the reactive power controller is a frequency deviation Δf, Δf and a rated frequency $f_0$ of each of the two wind turbine units are added to obtain a frequency f of a corresponding wind turbine unit; $K_2$ is a proportional coefficient; $T_{Q1}$ and $T_{Q2}$ are time constants; and s is a Laplace operator.

(2) $U_{wt}{}^*$ is taken as a d-axis voltage reference value $u_{fd}{}^*$. A q-axis voltage reference value $u_{fq}{}^*$ is set to be 0. $u_{fd}{}^*$ is converted into a d-axis modulating voltage reference value $u_{vd}{}^*$ through modulation by using a voltage controller and a current controller in sequence; and $u_{fq}{}^*$ is converted into a q-axis modulating voltage reference value $u_{vq}{}^*$ through modulation by using the voltage controller and the current controller in sequence.

(3) The frequency f of each of the two wind turbine units is subjected to integral transformation to obtain a reference phase θ of each of the two wind turbine units. $u_{vd}{}^*$ and $u_{vq}{}^*$ are subjected to coordinate transformation to obtain three-phase modulating voltage reference values $u_{va}$, $u_{vb}$ and $u_{vc}$ in an abc coordinate system by using the reference phase θ. The $u_{va}$, $u_{vb}$ and $u_{vc}$ are subjected to pulse width modulation (PWM) to control the power switching devices in the grid-side converter of each of the wind-turbine units.

In this embodiment, the parameters of the system provided herein are shown in the following Table 1.

TABLE 1

Parameters of DRU-based offshore wind power transmission system

| Items | Scale |
|---|---|
| Equivalent wind turbine units | |
| Rated power | 150/150 MW |
| Rated fundamental frequency of wind-turbine grid-side converter | 100 Hz |
| Alternating-current submarine cable | |
| Rated voltage | 66 kV |
| Length | 5 km(#1), 10 km(#2) |
| Rectifier station | |
| Converter transformer capacity | 2 × 165 MVA |
| Converter transformer ratio | 66 kV/89 kV |
| Converter transformer leakage reactance | 0.15 p.u. |
| Direct-current submarine cable | |
| Rated direct current voltage | ±110 kV |
| Length | 120 km |
| Inverter | |
| Converter transformer capacity | 330 MVA |

TABLE 1-continued

Parameters of DRU-based offshore wind power transmission system

| Items | Scale |
|---|---|
| Converter transformer ratio | 220 kV/110 kV |
| Converter transformer leakage reactance | 0.15 p.u. |
| Rated direct current voltage | ±110 kV |

Figure 4A:
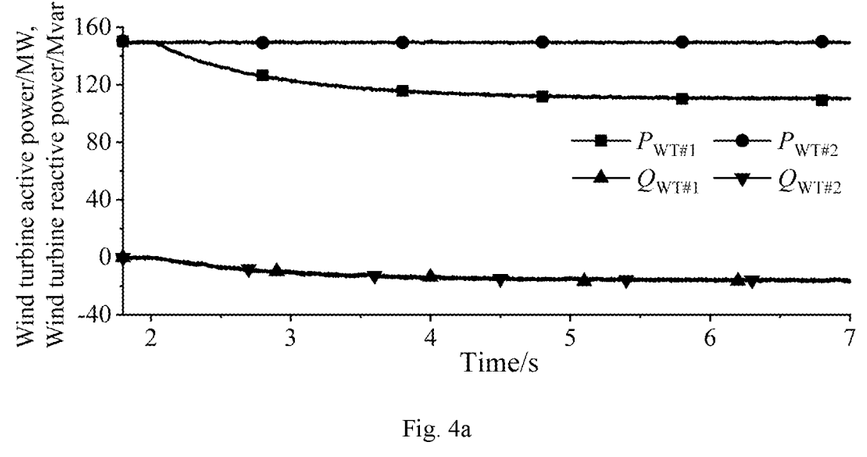
FIG. 4a schematically illustrates simulation waveforms of active power and reactive power output by the wind turbine according to an embodiment of this application.
Figure 4B:
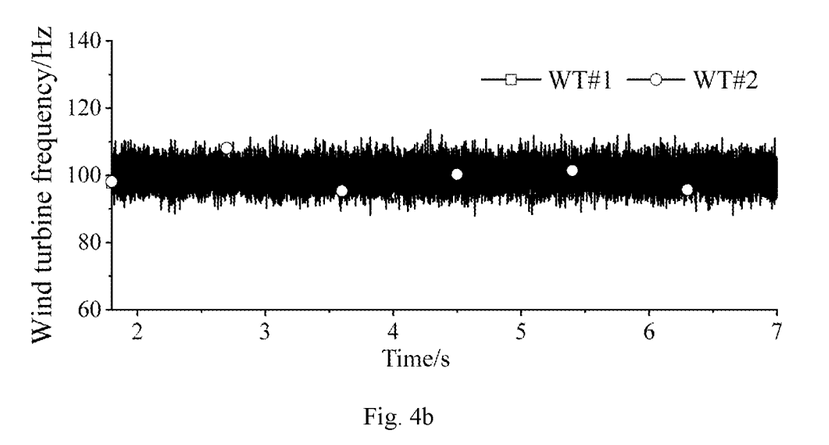
FIG. 4b schematically shows a simulation waveform of an alternating current frequency of the wind turbine according to an embodiment of this application.
Figure 5A:
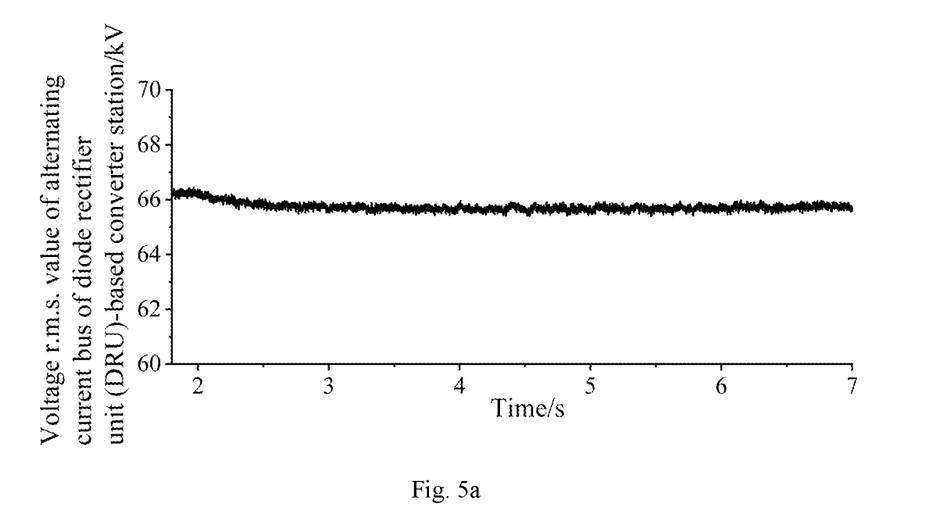
FIG. 5a schematically depicts a simulation waveform of an effective alternating voltage of a DRU-based converter station according to an embodiment of this application.
Figure 5B:
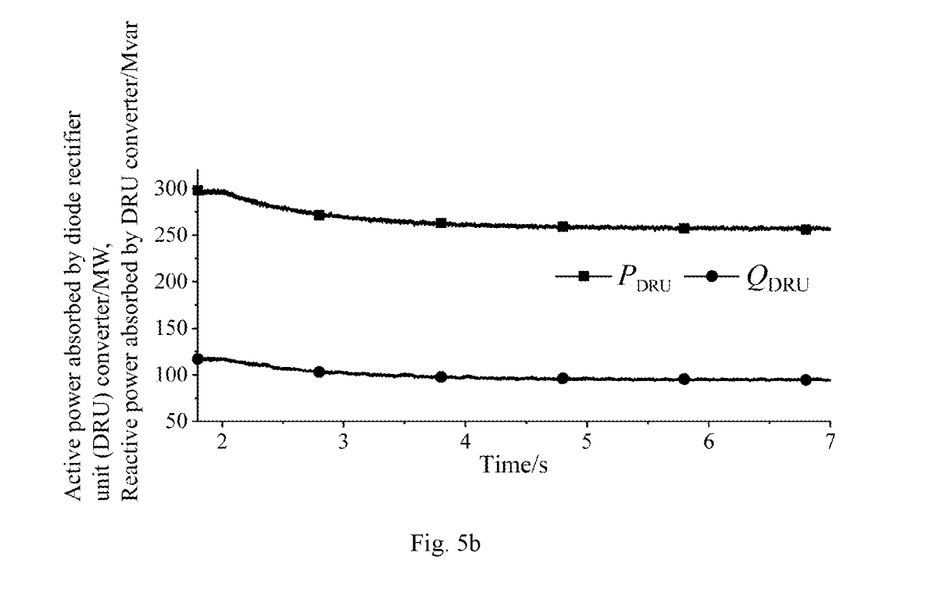
FIG. 5b schematically shows simulation waveforms of active power absorbed by a DRU-based converter and reactive power absorbed by the DRU converter according to an embodiment of this application.
Figure 6A:
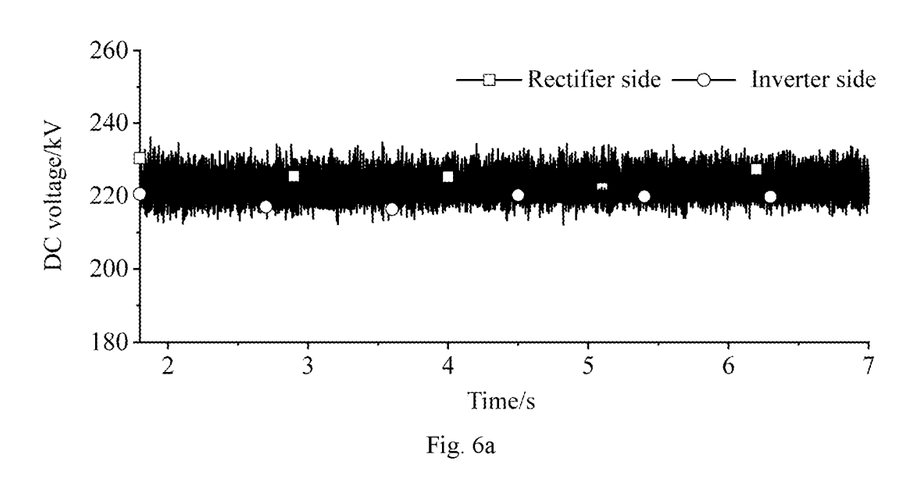
FIG. 6a schematically illustrates a simulation waveform of a direct current voltage of the DRU-based offshore wind power transmission system according to an embodiment of this application.
Figure 6B:
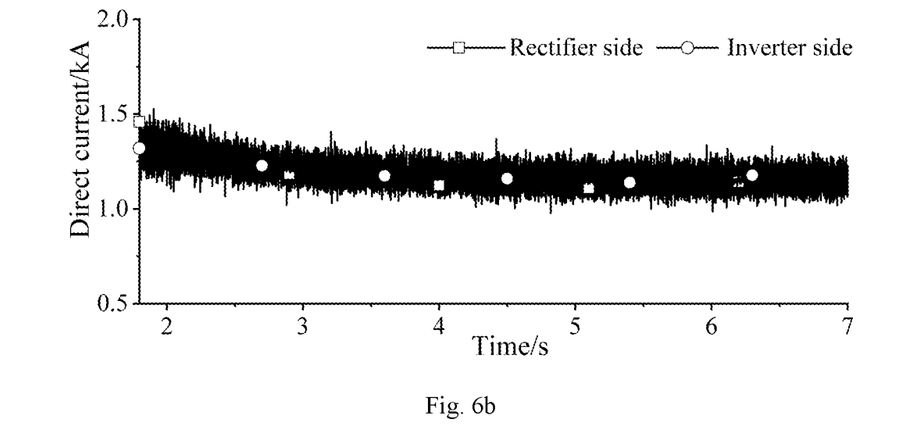
FIG. 6b schematically illustrates a simulation waveform of a direct current of the DRU-based offshore wind power transmission system according to an embodiment of this application.

A corresponding simulation platform was built in the electromagnetic transient simulation software (Power System Computer Aided Design) PSCAD/EMTDC to simulate the fluctuation of the wind speed of the wind turbine $WT_1$. Before t=2.0 s, the two wind turbines have been running stably at a rated wind speed of 12 m/s. Assuming that the wind speed of the wind turbine $WT_1$ drops from 12 m/s to 11 m/s stepwise at t=2.0 s, FIGS. 4a and 4b show the simulation results of the key electrical quantities of the grid-forming wind turbine, FIGS. 5a and 5b show the simulation results of the key electrical quantities of the DRU rectifier station, FIGS. 6a and 6b show the simulation results of the DC voltage and the DC current. The simulation results illustrated in the figures prove the effectiveness of the control method provided herein.

Described above are merely illustrative of this application, and are intended to facilitate the understanding and implementation of this application. It should be understood that various modifications, improvements and replacements made by those skilled in the art without departing from the spirit and scope of this application shall fall within the scope of this application defined by the appended claims.

What is claimed is:

1. A grid-forming wind turbine control method for a diode rectifier unit (DRU)-based offshore wind power transmission system, the DRU-based offshore wind power transmission system comprising an offshore wind farm; the offshore wind farm comprising a plurality of wind turbine units; the grid-forming wind turbine control method being used to control a grid side converter of each of the plurality of wind turbine units; and the grid-forming wind turbine control method comprising:

(1) converting, by an active power controller, a difference between $P_{wt}^*$ and $P_{wt}$ into a voltage amplitude reference value $U_{wt}^*$; and converting, by a reactive power controller, a difference between $Q_{wt}$ and $Q_{wt}^*$ into a frequency f of each of the plurality of wind turbine units; wherein $P_{wt}^*$ is an active power reference value of each of the plurality of wind turbine units; $Q_{wt}^*$ is a reactive power reference value of each of the plurality of wind turbine units; $P_{wt}$ is an actual active power output of each of the plurality of wind turbine units; and $Q_{wt}$ is an actual reactive power output of each of the plurality of wind turbine units;

(2) taking $U_{wt}^*$ as a d-axis voltage reference value $u_{fd}^*$; letting a q-axis voltage reference value $u_{fq}^*$ be equal to 0; converting $u_{fd}^*$ into a d-axis modulating voltage reference value $u_{vd}^*$ through modulation by using a voltage controller and a current controller in sequence; and converting $u_{fq}^*$ into a q-axis modulating voltage reference value $u_{vq}^*$ through modulation by using the voltage controller and the current controller in sequence; and (3) subjecting the frequency f of each of the plurality of wind turbine units to integral transformation to obtain a reference phase θ of each of the plurality of wind turbine units; subjecting the $u_{vd}^*$ and $u_{vq}^*$ to coordinate transformation to obtain three-phase modulating voltage reference values $u_{va}$, $u_{vb}$ and $u_{vc}$ in an abc coordinate system by using the reference phase θ; and subjecting the $u_{va}$, $u_{vb}$ and $u_{vc}$ to pulse width modulation (PWM) to control power switching devices in the grid-side converter of each of the plurality of wind turbine units.

2. The grid-forming wind turbine control method of claim 1, wherein the actual reactive power output $Q_{wt}$ of each of the plurality of wind turbine units is represented based on a per-unit value of a capacity of a corresponding wind turbine unit.

3. The grid-forming wind turbine control method of claim 1, wherein the plurality of wind turbine units are the same in the reactive power reference value $Q_{wt}^*$; and the reactive power reference value $Q_{wt}^*$ is a constant value and does not change with time.

4. The grid-forming wind turbine control method of claim 1, wherein reactive power controllers respectively used for controlling grid-side converters of the plurality of wind turbine units have the same structure and parameters.

5. The grid-forming wind turbine control method of claim 1, wherein the active power controller adopts a lead-lag link in series with an integral link, and a transfer function of the lead-lag link in series with the integral link is expressed as $$K_1 \frac{T_{P1}s+1}{T_{P2}s^2+s};$$

wherein $K_1$ is a proportional coefficient; $T_{P1}$ and $T_{P2}$ are time constants; and s is a Laplace operator.

6. The grid-forming wind turbine control method of claim 1, wherein the reactive power controller adopts a lead-lag link, and a transfer function of the lead-lag link is expressed as $$K_2 \frac{T_{Q1}s+1}{T_{Q2}s+1};$$

wherein an output of the reactive power controller is a frequency deviation Δf, the Δf and a rated frequency $f_0$ of each of the plurality of wind turbine units are added to obtain the frequency f of a corresponding wind turbine unit; wherein $K_2$ is a proportional coefficient; $T_{Q1}$ and $T_{Q2}$ are time constants; and s is a Laplace operator.

7. The grid-forming wind turbine control method of claim 1, wherein the reference phase θ is an integral result of the frequency f of each of the plurality of wind turbine units with respect to time.

8. The grid-forming wind turbine control method of claim 1, wherein the DRU-based offshore wind power transmission system is a low-frequency offshore wind power alternating-current (AC) collection and transmission system, a power-frequency offshore wind power AC collection and direct-current (DC) transmission system or a medium-frequency offshore wind power AC collection and DC transmission system.

* * * * *